Patented Dec. 23, 1941

2,266,778

UNITED STATES PATENT OFFICE 2,266,778

UNSATURATED COMPOUNDS OF THE CYCLOPENTANOPOLYHYDROPHENANTHRENE SERIES WITH AN UNSATURATED SIDE CHAIN IN THE CYCLOPENTANO NUCLEUS AND A PROCESS FOR THEIR MANUFACTURE

Willy Logemann, Berlin-Charlottenburg, and Hans Herloff Inhoffen, Berlin-Wilmersdorf, Germany, assignors to Schering Corporation, Bloomfield, N. J., a corporation of New Jersey No Drawing. Application November 19, 1938, Serial No. 241,467. In Germany October 5, 1937

8 Claims. (Cl. 260—397.5)

This invention relates to unsaturated compounds of the cyclopentanopolyhydrophenanthrene series with an unsaturated side chain in the cyclopentano nucleus and a process for their manufacture.

Specification Serial No. 111,363 describes and claims a process for the manufacture of tertiary alcohols of the cyclopentano-polyhydrophenanthrene series, in which compounds of the said series saturated or unsaturated in the ring system and containing a keto group are treated with acetylene or substituted acetylenes in the presence of an alkali metal such as sodium or lithium, or an alkali metal compound, such as an alkali amide or alcoholate. The ethinyl compounds thus formed may, according to a further feature of the invention of Serial No. 111,363, be hydrogenated to the corresponding ethyl compounds produced by complete saturation of the triple bond.

In accordance with the present invention valuable compounds exhibiting in the side chain a double bond are obtained when the said compounds triply unsaturated in the side chain are partially hydrogenated. For the partial hydrogenation all such reducing agents are suitable as are capable of converting a triple bond into a double bond. It can be carried out both with catalytically activated hydrogen, in which case as catalysts both noble and also base metals can be employed, and also with nascent hydrogen. As catalysts are suitable for example nickel catalysts with or without carrier, palladium or platinum black. For the hydrogenation by means of nascent hydrogen there comes into question for example coppered zinc dust in alcoholic solution such as methanol.

The reduction can be carried out both with and without excess pressure at ordinary or elevated temperature.

The products obtained are of importance from a physiological point of view and can in particular be further worked up to other hormones.

The following examples illustrate the invention:

Example 1

As catalyst is employed a nickel catalyst according to Rupe (Helv. Chem. Acta, vol. 50, page 453). The catalyst is reduced in a stream of hydrogen for twenty hours at 400–410° C. and stored under isopropyl alcohol.

A small quantity of the catalyst thus obtained is saturated with hydrogen in a shaking vessel. To it are added 2 grams of $\Delta^{5,6}$-3,17-dihydroxy-17-ethinyl-androstene dissolved in 100 cc. of methanol and the whole is shaken until the quantity of hydrogen taken up amounts to 1 mol. The solution is filtered from the catalyst and evaporated to dryness. From the residue is isolated by recrystallisation from the methanol $\Delta^{5,6}$-3,17-dihydroxy-17-ethenyl-androstene, the melting point of which is 186° C.

Example 2

As starting material is employed 3,17-dihydroxy-17-ethinyl-androstane. The hydrogenation is carried out as described in Example 1. The melting point of the 3,17-dihydroxy-17-ethenyl-androstane is 208° C.

Example 3

0.2 gram of palladium black which has stood in the air for a long time is saturated with hydrogen in methanol. To this is added 1 gram of 3-acetoxy-17-hydroxy-17-ethinyl-androstane dissolved in 50 cc. of methanol and the whole is shaken until the amount of hydrogen taken up amounts to 1 mol. Then the liquid is filtered from the catalyst, concentrated and allowed to crystallise. The melting point of the 3-acetoxy-17-hydroxy-17-ethenyl-androstane obtained is 148° C.

Example 4

0.4 gram of $\Delta^{5,6}$-3,17-dihydroxy-17-ethinyl-androstene is dissolved in 20 cc. of methanol and 5 cc. of water in the hot. To the solution is added 1 gram of coppered zinc dust and the mixture boiled under a reflux condenser for 24 hours. Then the product is filtered and the solution extracted with ether. The residue obtained on evaporation of the ether is crystallised several times from methanol until the product exhibits a melting point of 186° C.

Example 5

As starting material is employed 17-ethinyl-iso-androstandiol-(3,17). On hydrogenation as described in Example 1 17-ethenyl-iso-androstandiol-(3,17) is obtained which melts at 207° C.

Example 6

0.5 gram of 17-ethinyl-estradiol-3,17 is dissolved in 100 cc. of absolute alcohol and the solution after the addition of 0.5 gram of nickel catalyst according to Rupe, shaken with hydrogen in a shaking vessel. After taking up 58 cc. of hydrogen (somewhat more than 1 mol) the hydrogenation is interrupted, the solution filtered from catalyst and evaporated. The residue is recrystallised from aqueous methanol and yields the 17-ethenyl-estradiol-3,17 of melting point 148–150° C.; yield 340 mg.

Of course, various other modifications in the procedure of the process of the present invention may be resorted to within the scope of the appended claims without departing from the principles set forth herein.

What we claim is:

1. Process for the manufacture of cyclopentano polyhydro phenanthrene compounds having at the 17-position an aliphatic side chain containing a carbon-carbon double bond, comprising subjecting a steroid compound having on the carbon atom 17 an aliphatic side chain containing a carbon-carbon triple bond, to the action of a hydrogenating agent for triple bonds, and stopping the hydrogenation when only about 1 mol of hydrogen has been introduced into each mol of the compound.

2. Process as claimed in claim 1 in which catalytically activated hydrogen is employed.

3. Process as claimed in claim 1 in which nascent hydrogen is employed.

4. Process as claimed in claim 1 in which as starting material $\Delta^{5,6}$-3,17-dihydroxy-17-ethinyl-androstene is employed.

5. Process as claimed in claim 1 in which as starting material 3,17-dihydroxy-17-ethinyl-androstane is employed.

6. Process as claimed in claim 1 in which as starting material 17-ethinyl-estrane-3,17 is employed.

7. An ethenyl androstandiol compound of the general formula $C_{21}H_{33}OR$ and the structural formula

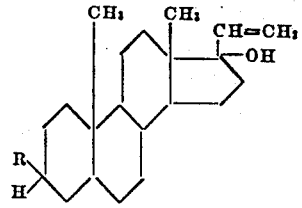

wherein R stands for a member of the group consisting of the hydroxyl group and group that, with the aid of hydrolysis, can be converted into a hydroxyl group.

8. An ethenyl dihydro follicle hormone compound of the general formula $C_{20}H_{25}OR$ and the structural formula

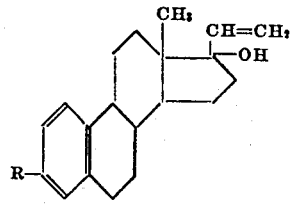

wherein R stands for a member of the group consisting of the hydroxyl groups and group that, with the aid of hydrolysis, can be converted into a hydroxyl group.

WILLY LOGEMANN.
HANS HERLOFF INHOFFEN.

CERTIFICATE OF CORRECTION.

Patent No. 2,266,778.                                   December 23, 1941.

WILLY LOGEMANN, ET AL.

It is hereby certified that error appears in the printed specification of the above numbered patent requiring correction as follows: Page 2, second column, line 2, claim 6, for "estrane" read --estradiol--; and that the said Letters Patent should be read with this correction therein that the same may conform to the record of the case in the Patent Office.

Signed and sealed this 3rd day of February, A. D. 1942.

(Seal)

Henry Van Arsdale,
Acting Commissioner of Patents.